(12) United States Patent
Werjefelt et al.

(10) Patent No.: US 12,050,323 B2
(45) Date of Patent: Jul. 30, 2024

(54) HEADS-UP DISPLAY APPARATUS FOR USE DURING A SMOKE EMERGENCY

(71) Applicants: Christian Werjefelt, Kaneohe, HI (US); Alexander Werjefelt, Kamuela, HI (US)

(72) Inventors: Christian Werjefelt, Kaneohe, HI (US); Alexander Werjefelt, Kamuela, HI (US)

(73) Assignee: VISIONSAFE, LLC, Kaneohe, HI (US)

( * ) Notice: Subject to any disclaimer, the term of this patent is extended or adjusted under 35 U.S.C. 154(b) by 207 days.

(21) Appl. No.: 16/923,185

(22) Filed: Jul. 8, 2020

(65) Prior Publication Data

US 2021/0011297 A1    Jan. 14, 2021

Related U.S. Application Data

(60) Provisional application No. 62/883,183, filed on Aug. 6, 2019, provisional application No. 62/872,523, filed on Jul. 10, 2019.

(51) Int. Cl.
*G02B 27/01* (2006.01)
*A62B 3/00* (2006.01)
*B64D 43/00* (2006.01)

(52) U.S. Cl.
CPC ......... *G02B 27/0176* (2013.01); *B64D 43/00* (2013.01); *G02B 27/0172* (2013.01); *G02B 2027/0156* (2013.01)

(58) Field of Classification Search
CPC .... G02B 2027/0167; G02B 2027/0169; G02B 27/04
See application file for complete search history.

(56) References Cited

U.S. PATENT DOCUMENTS

| | | | |
|---|---|---|---|
| 2008/0186586 A1* | 8/2008 | Yamamoto | G02B 27/0176 359/630 |
| 2009/0040296 A1* | 2/2009 | Moscato | G02B 27/0176 348/E13.001 |

(Continued)

FOREIGN PATENT DOCUMENTS

| | | |
|---|---|---|
| EP | 2990854 A1 | 3/2016 |
| KR | 20180122496 A | 11/2018 |

(Continued)

OTHER PUBLICATIONS

Notification of Transmittal of the International Search Report and the Written Opinion of the International Searching Authority, or the Declaration for PCT/US2020/041099 mailed on Sep. 29, 2020.

(Continued)

*Primary Examiner* — William Boddie
*Assistant Examiner* — Bipin Gyawali
(74) *Attorney, Agent, or Firm* — FRESH IP PLC

(57) ABSTRACT

A heads-up display apparatus for attachment to a goggle, comprising an enclosure for receiving within a heads-up display, the enclosure having a proximal wall adjacent a viewing window of the goggle and a distal wall away from the viewing window; the proximal wall is transparent; and the proximal wall and the heads-up display are in a line of sight of a user.

10 Claims, 14 Drawing Sheets

(56) References Cited

U.S. PATENT DOCUMENTS

| | | | | |
|---|---|---|---|---|
| 2013/0088413 A1* | 4/2013 | Raffle | .................... | G09G 3/003 |
| | | | | 359/630 |
| 2013/0147621 A1* | 6/2013 | Kwong | .................... | A62B 3/00 |
| | | | | 340/521 |
| 2013/0222213 A1* | 8/2013 | Abdollahi | ................ | G09G 5/00 |
| | | | | 359/630 |
| 2013/0249776 A1* | 9/2013 | Olsson | .................... | G06F 1/163 |
| | | | | 345/8 |
| 2015/0217145 A1* | 8/2015 | Teetzel | .................. | A62B 9/006 |
| | | | | 359/885 |
| 2015/0323797 A1* | 11/2015 | Ellsworth | .............. | G02B 27/01 |
| | | | | 359/630 |
| 2015/0378432 A1 | 12/2015 | Abdollahi | | |
| 2016/0062125 A1* | 3/2016 | Baek | .................. | G02B 27/0176 |
| | | | | 361/679.01 |
| 2016/0147071 A1* | 5/2016 | Fujishiro | .............. | H04N 13/344 |
| | | | | 359/632 |
| 2017/0363874 A1* | 12/2017 | Tricoukes | ................ | G06F 1/163 |
| 2018/0304107 A1* | 10/2018 | Juran | ..................... | A62B 18/02 |
| 2019/0004325 A1* | 1/2019 | Connor | .............. | G02B 27/0172 |
| 2019/0141847 A1* | 5/2019 | Chang | .................. | H05K 5/0086 |

FOREIGN PATENT DOCUMENTS

| | | |
|---|---|---|
| WO | WO 2017/142480 A1 | 8/2017 |
| WO | WO 2018/203588 A1 | 11/2018 |

OTHER PUBLICATIONS

EPO, Extended Search Report, Application No. 20836600.5, Jul. 6, 2022.

\* cited by examiner

HEADS-UP DISPLAY APPARATUS FOR USE DURING A SMOKE EMERGENCY

FIELD OF THE INVENTION

The present invention is generally directed to a system to enable an operator to maintain visual contact with instruments or other visual sources of data after smoke and/or particulate from a fire or other sources has invaded the operator's environment. In particular, the present invention relates to providing a display in front of a user to provide a clear view of the instrument panel, thereby providing a pilot with vital information for guiding the aircraft to a safe landing after smoke and/or particulate matter invades the cockpit area.

BACKGROUND OF THE INVENTION

When cockpits are invaded by continuous, dense, blinding smoke that turn airplanes into unguided missiles, the results are well known to be catastrophic and fatal for passengers and crew. None creates an unsafe condition faster than a pilot blinded by continuous, opaque smoke. And none occurs as frequently as smoke in the cockpit. According to the Air Line Pilots Association, airliners make an unscheduled or emergency landing due to smoke in the cockpit on an average of once per day.

What is true for a cockpit is equally true for any operator station where the operator's ability to see the instrument panel when smoke invades the operator's station depends on the safe operation or orderly shutdown of critical processes, such as occur in a nuclear power station, submarine and similar operator stations.

The present invention is related to U.S. Pat. No. 9,914,546, hereby incorporated herein by reference.

SUMMARY OF THE INVENTION

The present invention provides a heads-up display apparatus for attachment to a goggle, comprising an enclosure for receiving within a heads-up display, the enclosure having a proximal wall adjacent a viewing window of the goggle and a distal wall away from the viewing window; the proximal wall is transparent; and the proximal wall and the heads-up display are in a line of sight of a user.

The present invention also provides a goggle, comprising a first enclosure including a viewing window, the first enclosure for being attached to a user's face to enclose the user's eyes; a second enclosure for receiving within a heads-up display, the second enclosure is operably attached to the first enclosure, the second enclosure having a proximal wall adjacent to the viewing window of the first enclosure and a distal wall away from the viewing window; the proximal wall is transparent; and the proximal wall, the heads-up display and the viewing window are in a line of sight of a user.

The present invention further provides a goggle, comprising an enclosure including a viewing window, the enclosure for being attached to a user's face to enclose the user's eyes; and a heads-up display disposed in a line of sight of the viewing window.

DETAILED DESCRIPTION OF THE INVENTION

Figure 1:
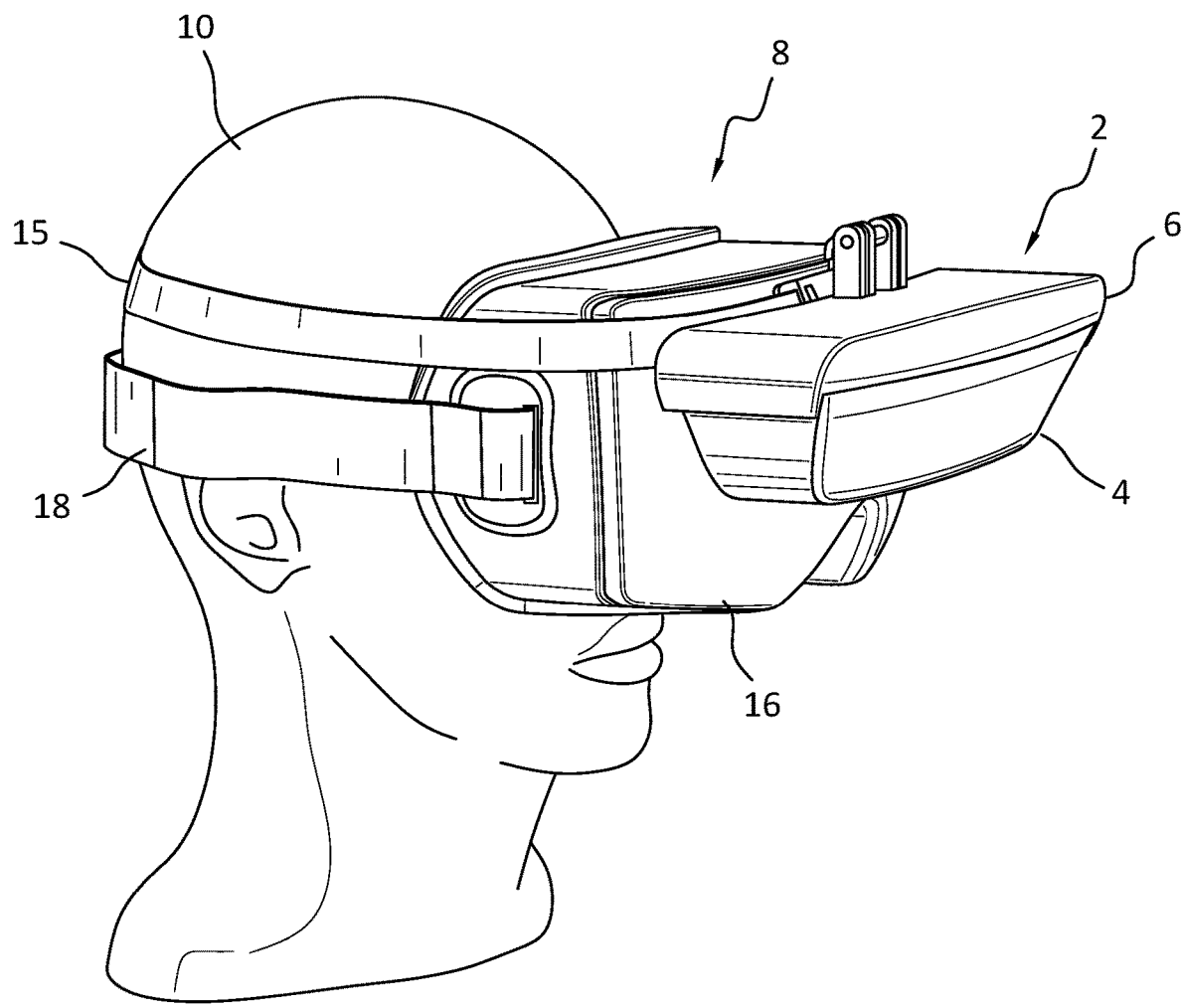
FIG. 1 is a perspective view of a goggle with a heads-up display apparatus shown in an operative position.

A heads-up display apparatus embodying the present invention is shown in FIG. 1. The heads-up display apparatus includes an enclosure or housing 2, including a housing portion 4 and a cap 6. Parts of the housing portion 4 is transparent.

The cap 6 may be opaque. The housing 2 is preferably made of rigid material, such as plastic, metal, etc. The housing 2 is preferably removably attached to a standard facemask or goggle 8 that is worn by a user 10 during a smoke emergency. The goggle 8 is shown as a single lens goggle, but it should be understood that the goggle 8 may also include a pair of lenses, in which case it is referred to as a pair of goggles. The goggle 8 is worn by the user during an emergency to enclose and seal the user's eyes from the outside to protect the eyes from the smoke. The goggle 8 is understood to define an enclosure when worn by the user.

The housing 2 is preferably separate from the goggle 8 so that the housing 2 may be attached to the goggle 8 only when needed and detached when not needed. The goggle 8 includes a transparent viewing window 16 and a strap 18 for securing the goggle 8 to the user. The housing 2 has a strap 15 for removably attaching the housing 2 to the goggle 8. The strap 15 is operably attached the bracket 14 and placed around the user's head to pull the enclosure 2 against the viewing window 16 of the goggle 8. Other standard means for removably attaching the housing 2 to the goggle 8 may be used. The viewing window 16 may have a curved outside surface 17 (see FIG. 2). The transparent parts of the housing portion 4 is in line with the line of sight of the user through the viewing window 16. The housing 2 is preferably sealed from the outside environment to prevent smoke from entering the interior space of the housing.

Figure 2:
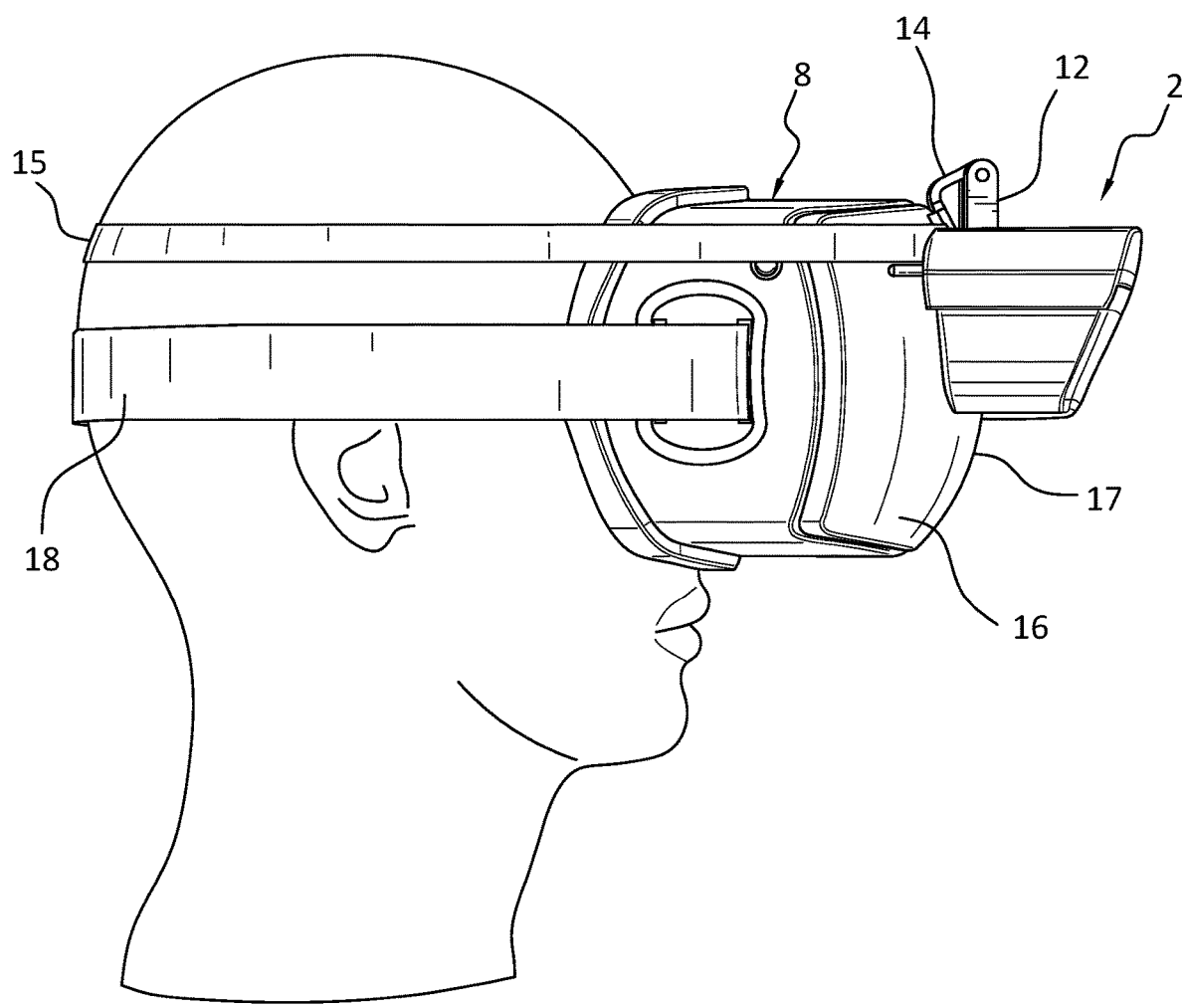
FIG. 2 is a side view of the goggle of FIG. 1.
Figure 3:
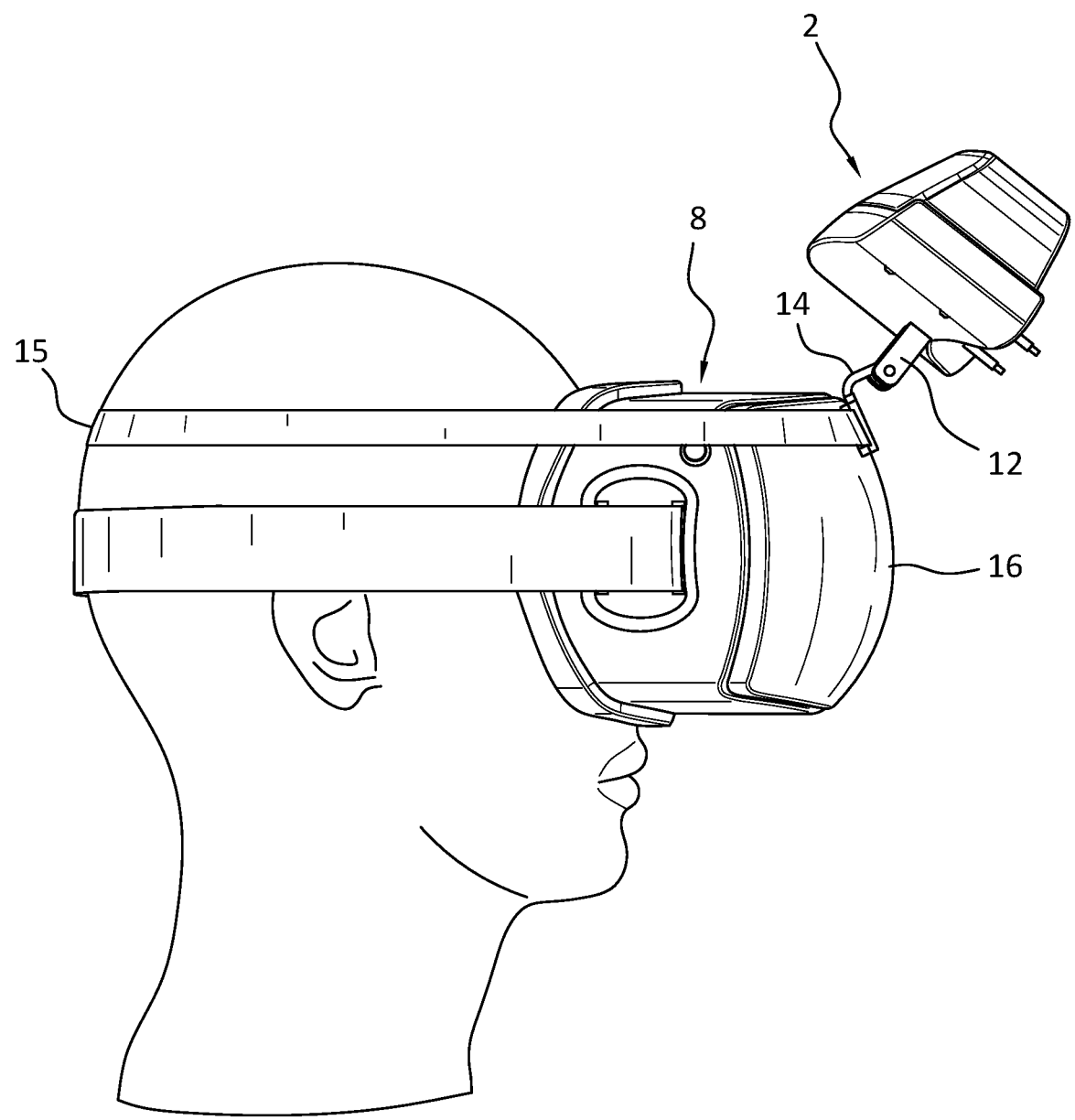
FIG. 3 is a side view of the goggle of FIG. 1, showing the heads-up apparatus rotated away from the goggle.
Figure 4:
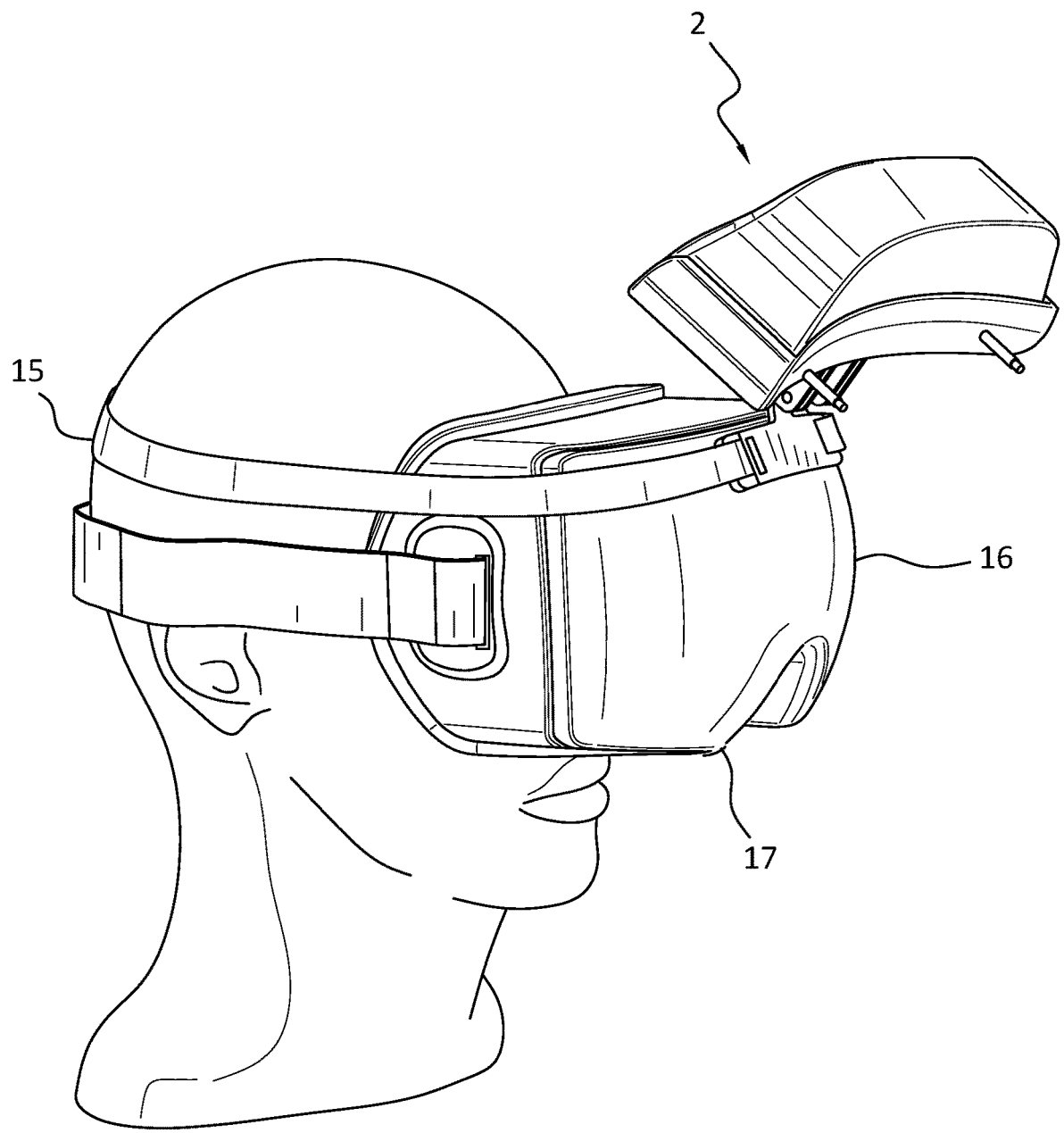
FIG. 4 is a perspective view of FIG. 3.

Referring to FIGS. 2, 3 and 4, the housing 2 includes a bracket 12 pivotally attached to another bracket 14, which is attached to the goggle 8 with the strap 15. The brackets 12 and 14 advantageously allow the user to position the housing 2 away from the viewing window 16 to give the user clear sight line through the viewing window 16 when emergency conditions have abated, allowing the user to see through the window 16 normally. The brackets 12 and 14 provide a hinged connection between the goggle 8 and the enclosure 2.

Figure 5:
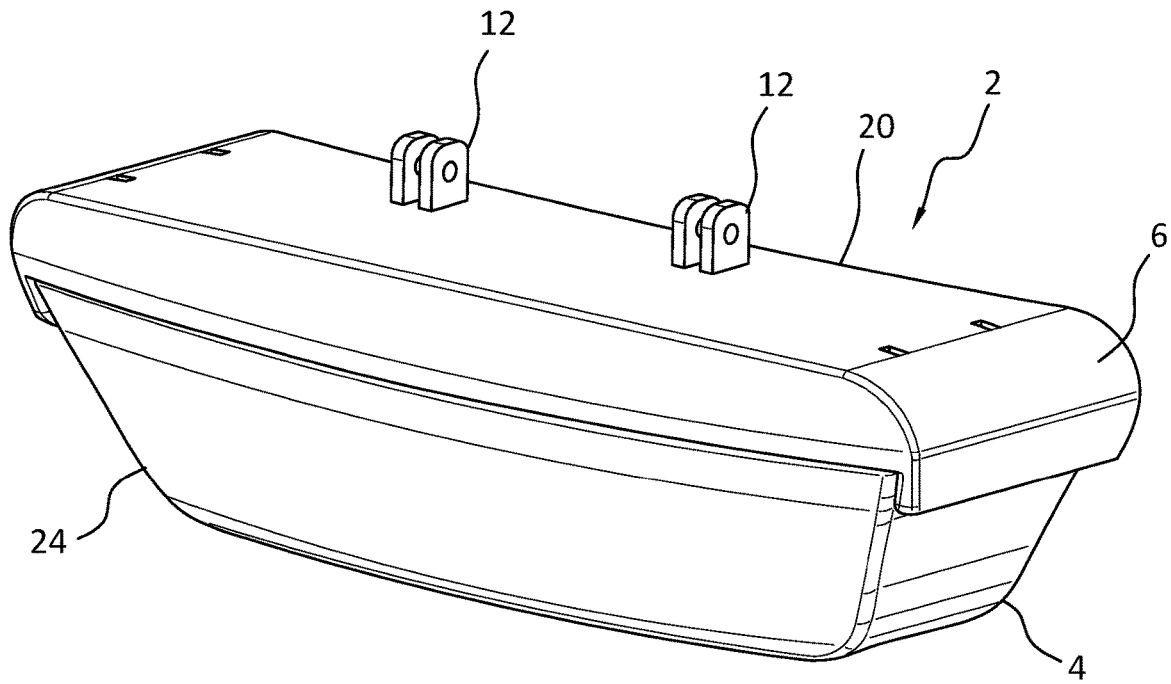
FIG. 5 is a front perspective view of the heads-up apparatus.
Figure 6:
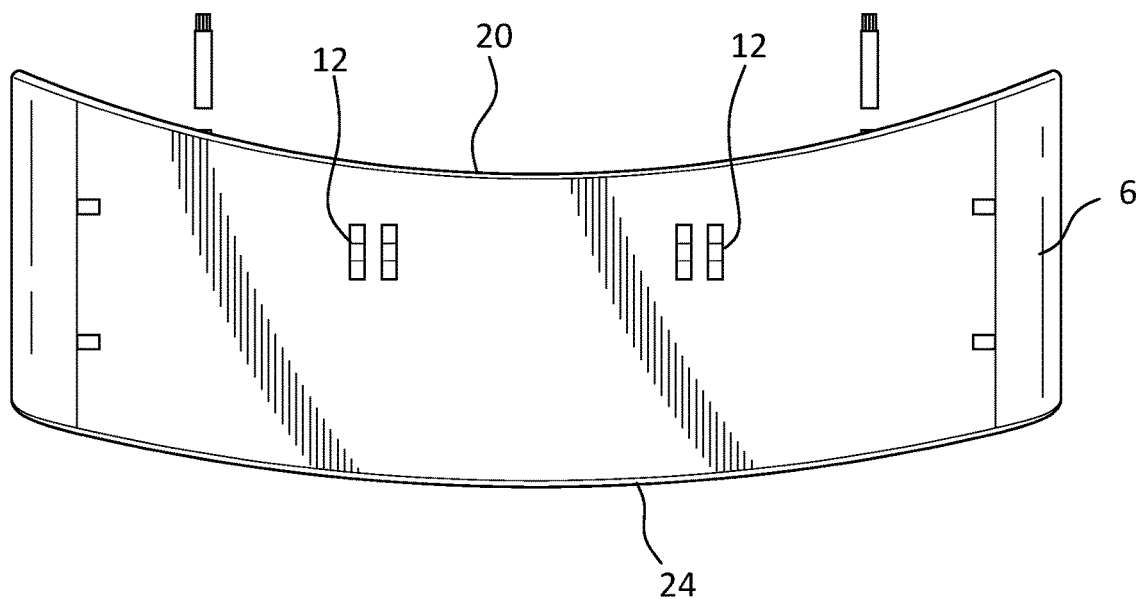
FIG. 6 is a top view of FIG. 5.
Figure 7:
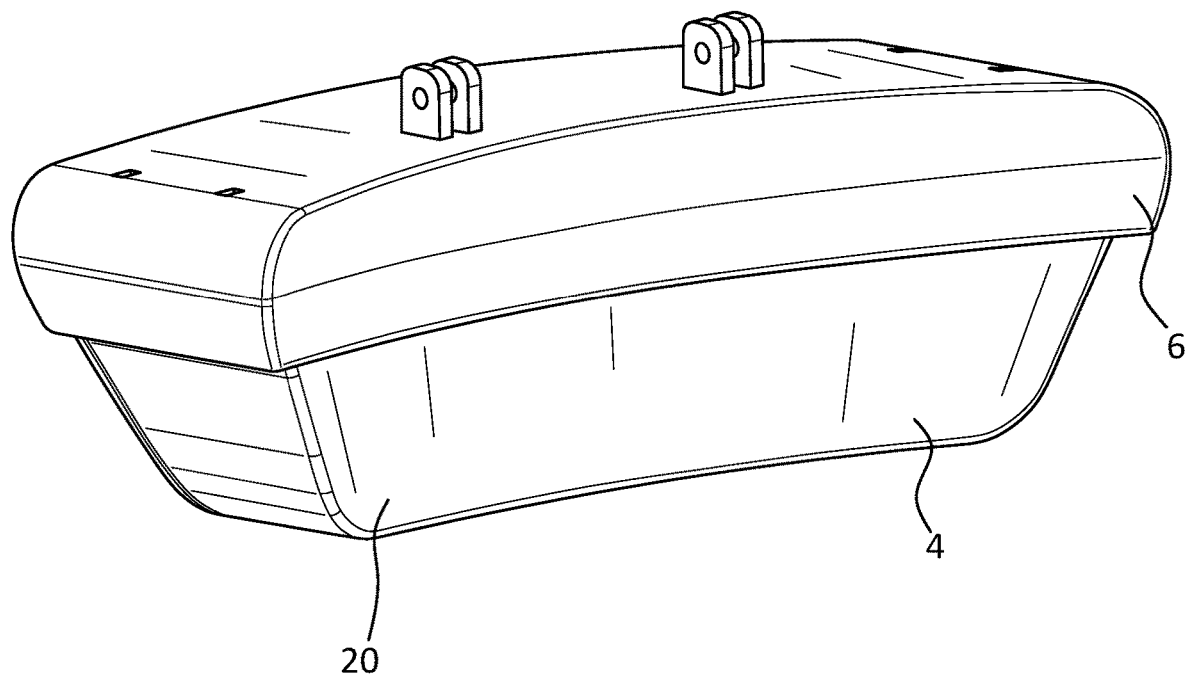
FIG. 7 is rear perspective view of FIG. 5.

Referring to FIGS. 5-7, the housing portion 4 includes a proximal transparent wall 20 adjacent to the viewing window 16 and a distal wall 24 away from the viewing window 16. The distal wall 24 may be opaque or transparent. The wall 20 may be curved to conform to the exterior surface 17 of the viewing window 16. In this manner, any gap between the viewing window 16 and the wall 20 may be reduced so that smoke would not reduce the visibility of the heads-up display inside the housing 2. The wall 20 is disposed adjacent to the viewing window 16 during use in an emergency.

Figure 8:
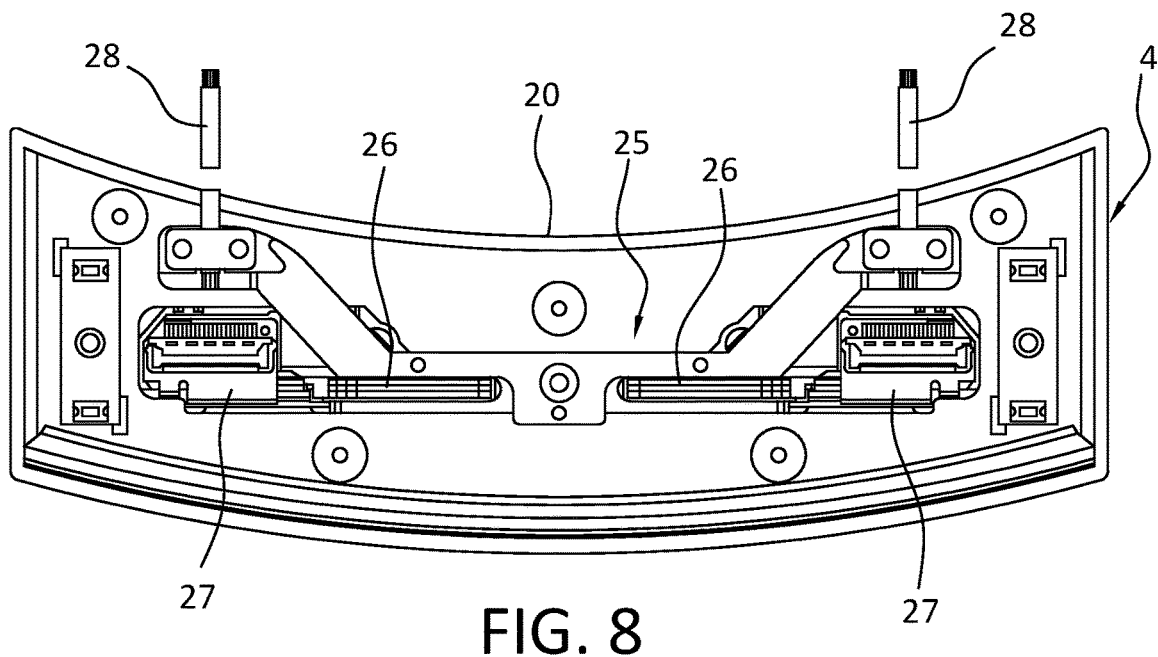
FIG. 8 is a top view of the heads-up apparatus with a cap removed to show the heads-up displays disposed inside the enclosure.
Figure 9:
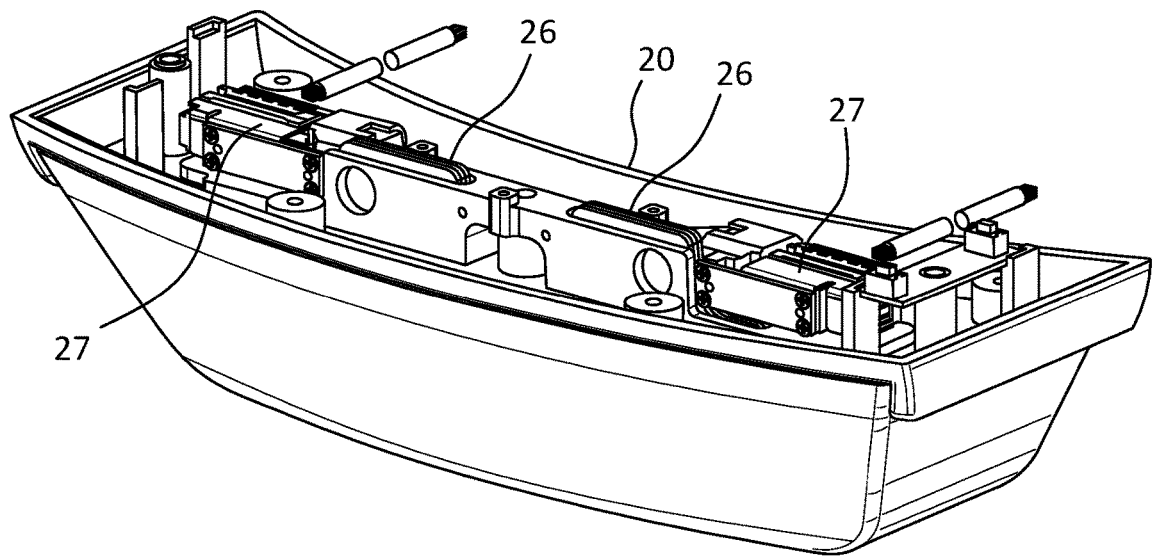
FIG. 9 is a perspective view of FIG. 8.

Referring to FIGS. 8 and 9, the cap 6 is removed to show a pair of standard heads-up display assemblies 25 with respective heads-up displays 26 and projectors 27 inside the housing portion 4. Although a pair of heads-up display 26 are shown, it should be understood that a single heads-up display may be sufficient to display the information required by the user by toggling between sources of information to be displayed. The display 26 may be a transparent screen made of glass or plastic, etc. that puts critical information in front of the user, so he can keep his head "up" instead of looking down or sideways to view it. Cables 28 provide signals from a source of information, such as an instrument panel, cameras pointed outside the cockpit to show the surrounding terrain, etc. for display in the heads-up displays 26. The cables 28 also provide power to the heads-up display assemblies 25.

An image is reflected from the heads-up displays 26 to the user. The user sees the image as if located in the far field in front of him. The heads-up display assembly 25 disclosed is only for illustration purposes and is not limited to what is specifically shown, as several heads-up displays are available from several manufacturers. An example of a commercial heads-up display is made by WaveOptics Inc., 1240 Rosecrans Avenue, #120 Manhattan Beach, CA 90266, enhancedworld.com. Other heads-up display manufacturers include Digilens, Sunnyvale, CA, digilens.com and dreamworldvision.com.

Figure 10:
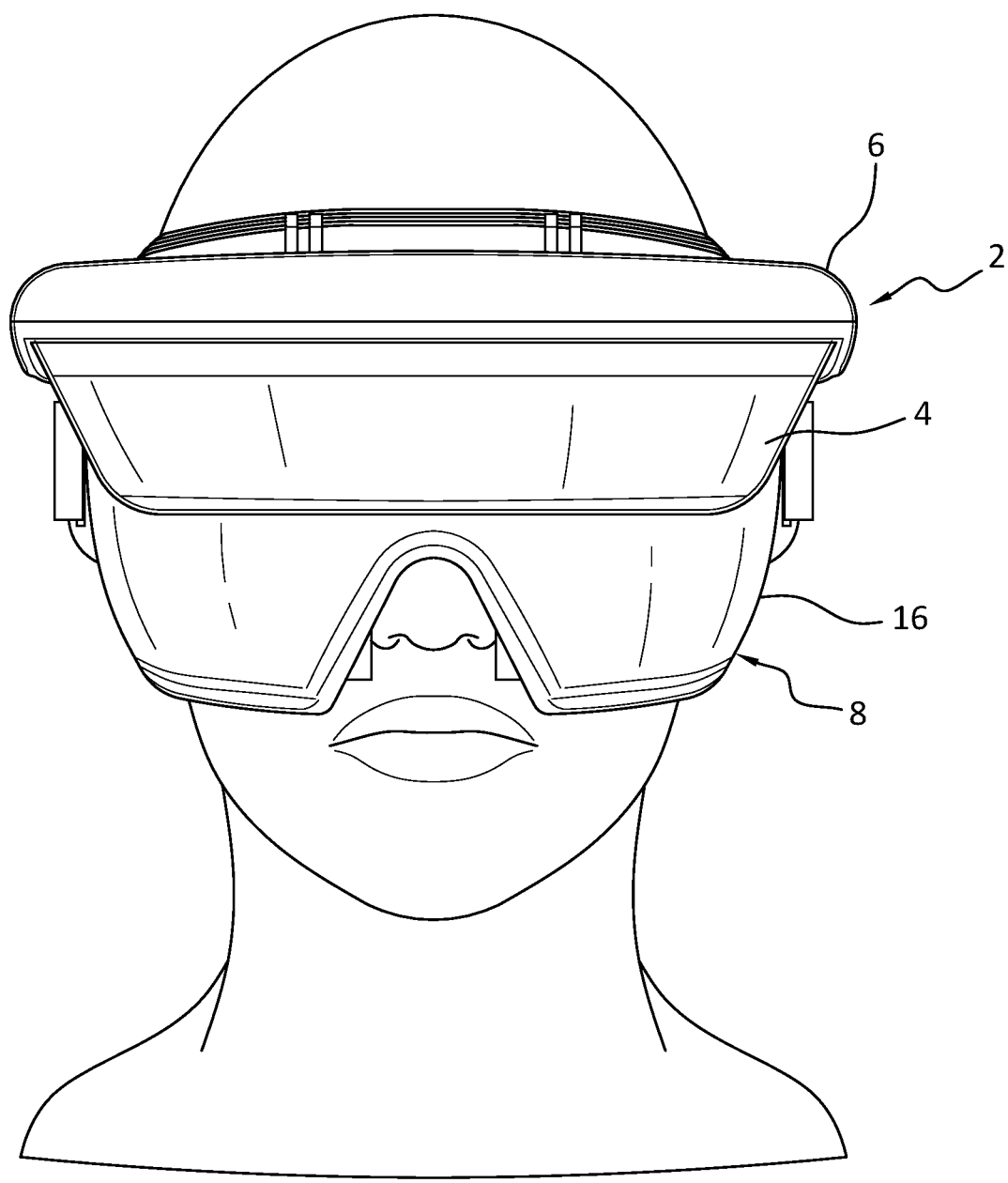
FIG. 10 is a front view of FIG. 1.

Referring back to FIGS. 1, 2 and 10, the housing 2 is shown in the operative position. When so deployed, the heads-up displays 26 shown in FIGS. 8 and 9 are understood to be disposed directly in the line of sight of the user. The enclosure 2 and the heads-up displays 26 disposed inside the enclosure are referred to as a heads-up display apparatus.

Figure 11:
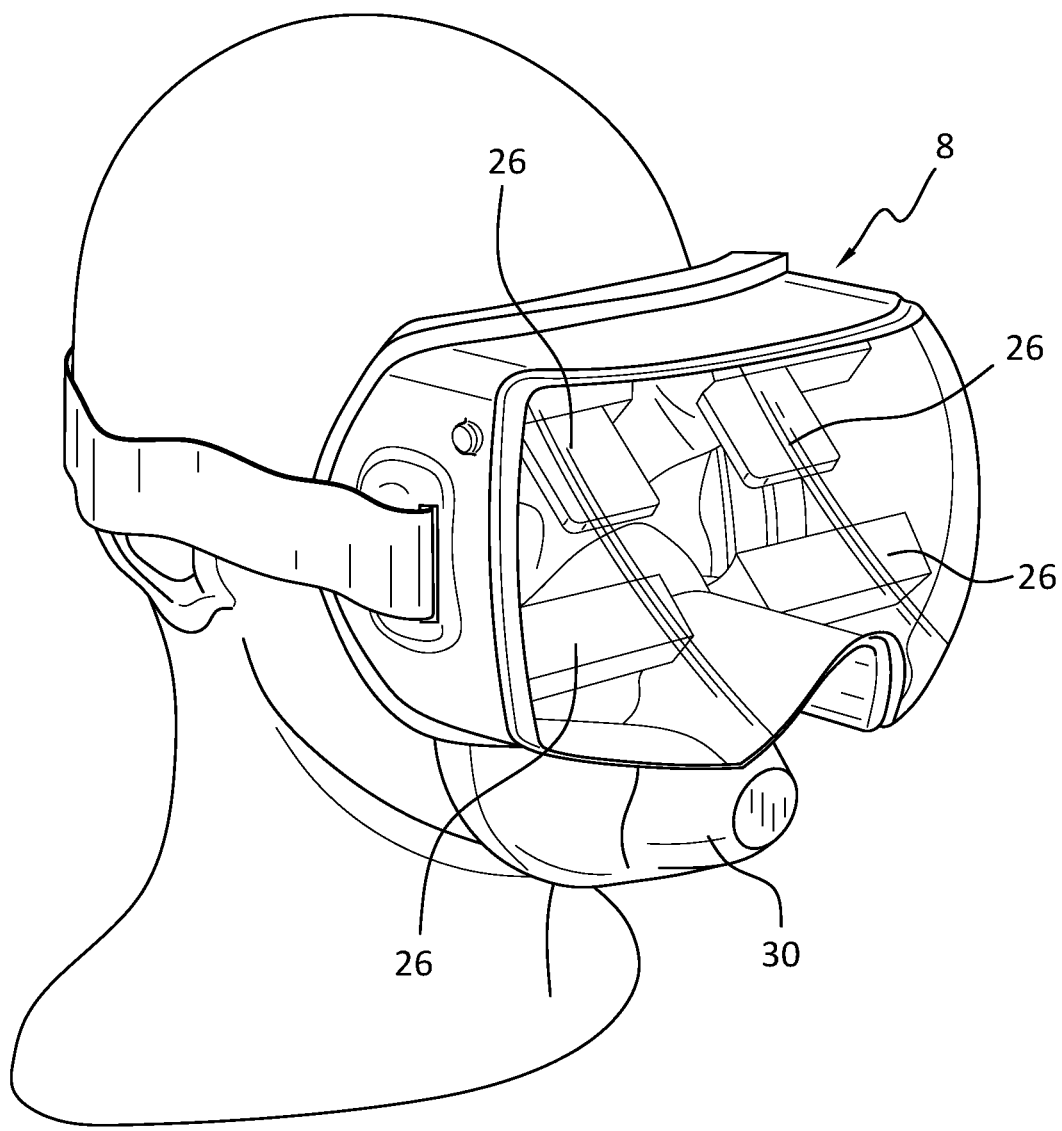
FIG. 11 is a perspective view of a goggle with heads-up displays integrated inside the goggle.
Figure 12:
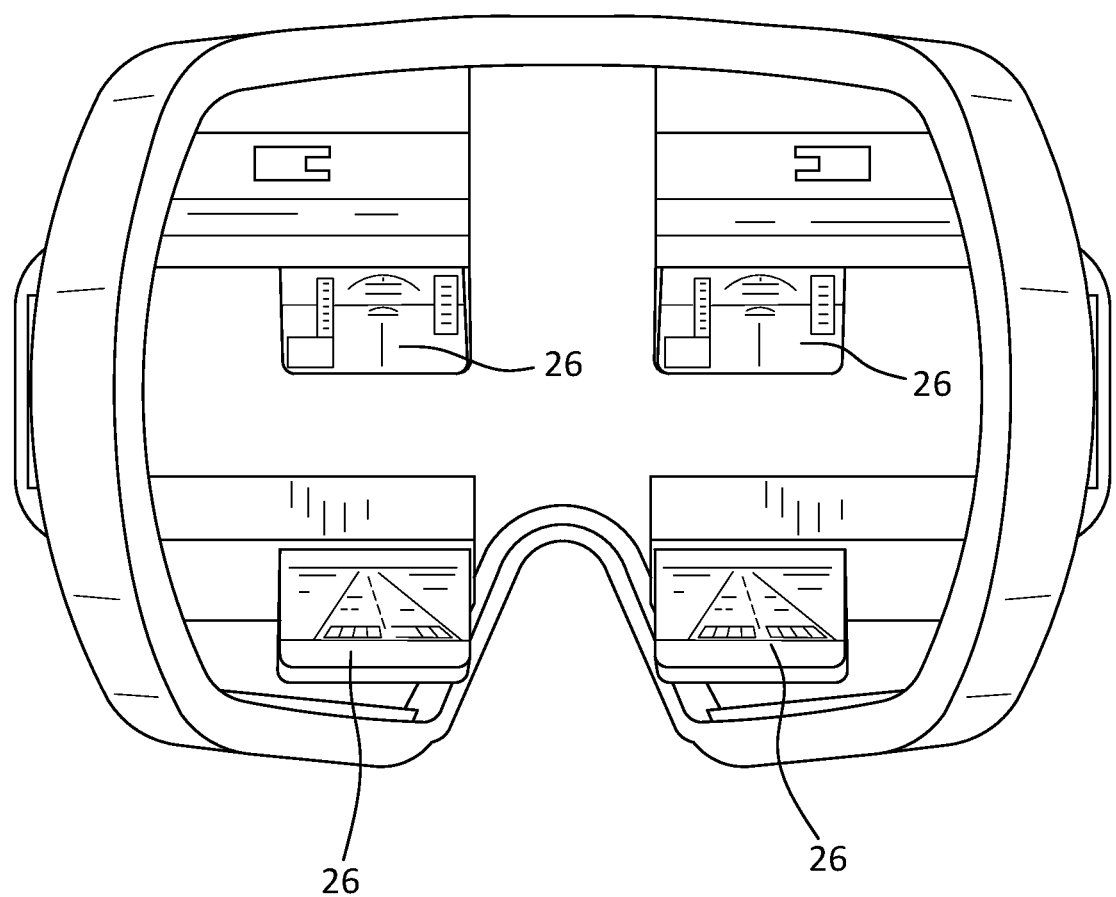
FIG. 12 is a rear view of the goggle of FIG. 11.

Referring to FIGS. 11 and 12, the heads-up display 26 may be incorporated into the goggle 8. The goggle 8 is shown with an oxygen mask 30. The displays 26 are disposed inside the goggle 8 in the line of sight of the viewing window 16. The placement of the displays 26 inside the goggle 8 advantageously prevents the smoke from the outside from degrading the image on the displays 26. The upper displays may be used to display outside views of the cockpit windshield. The lower displays 26 may be used to display information from the instrument panel. Although several displays are shown, a single display 26 may be sufficient to display the information needed by the user by toggling between the sources of information to be displayed.

Figure 13:
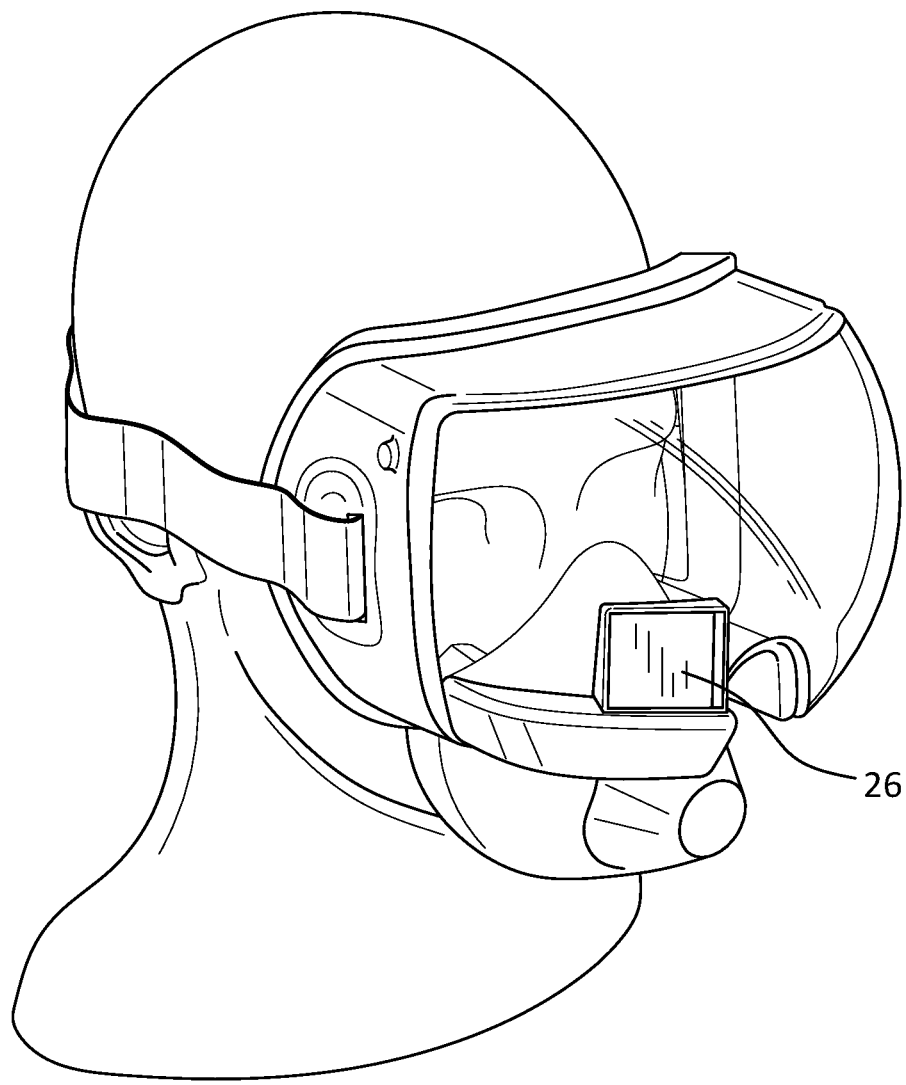
FIG. 13 is a perspective view of a goggle with a heads-up display incorporated to the outside of the goggle.
Figure 14:
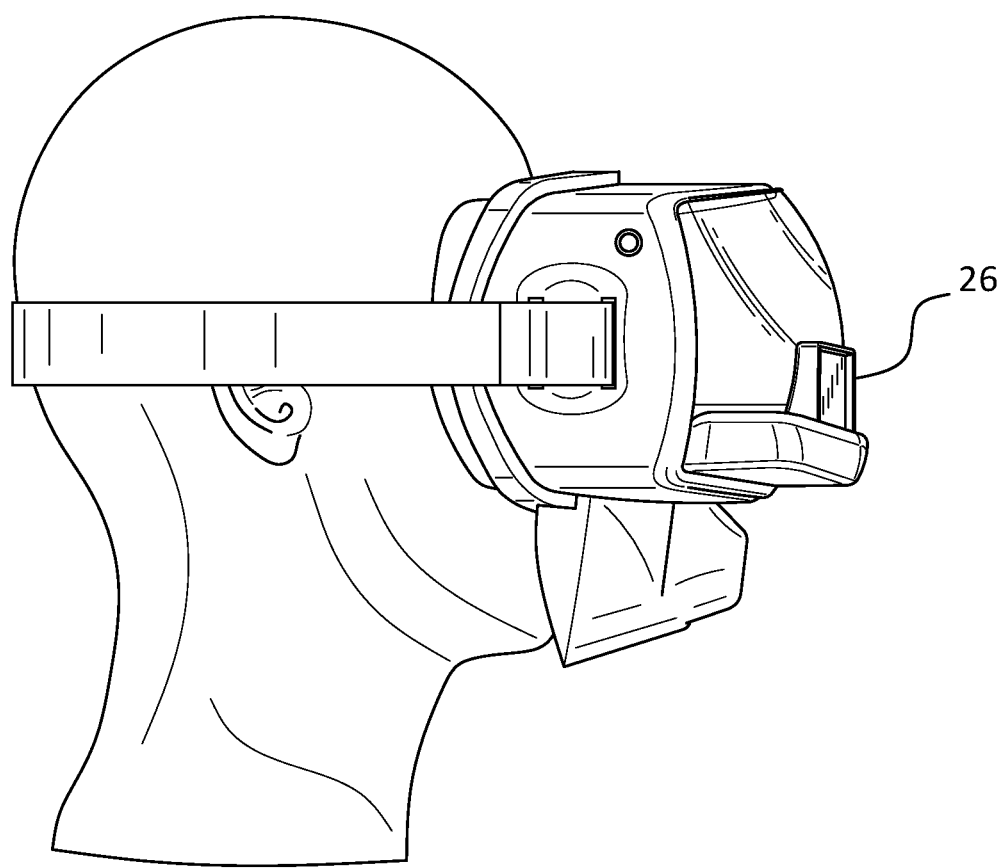
FIG. 14 is a side view of the goggle of FIG. 13.
Figure 15:
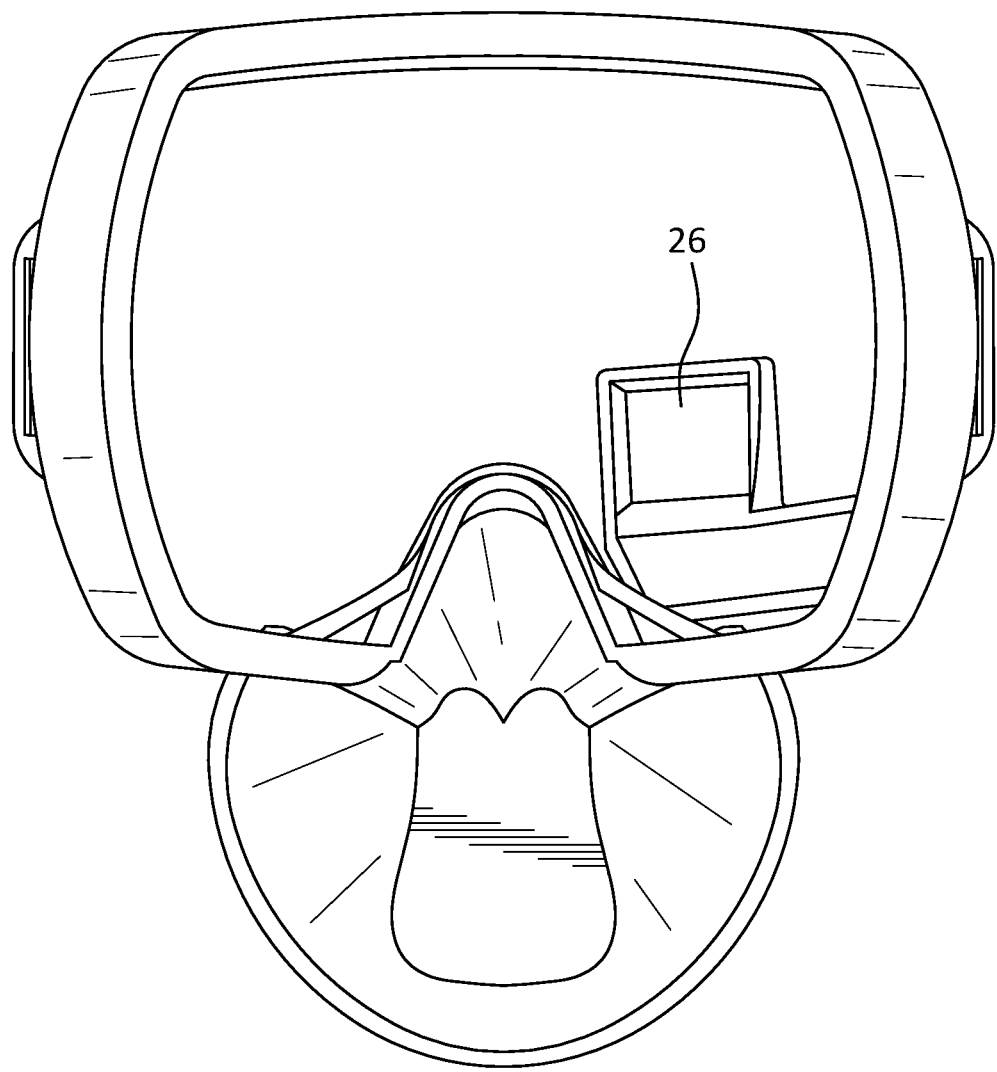
FIG. 15 is a rear view of the goggle of FIG. 13.

Referring to FIGS. 13-15, the heads-up display 26 may also be incorporated into the goggle 8 in the line of sight of the viewing window 16. The display 26 is shown outside the goggle 8 in close proximity to the viewing window 16. The heads-up display 26 may be sealed to the viewing window 16 to prevent smoke from coming between the viewing window 16 and the heads-up display 26 and thus degrade the image reflected to the user. Several sources of information may be displayed one at a time on the single display by toggling between the sources of information.

Figure 16:
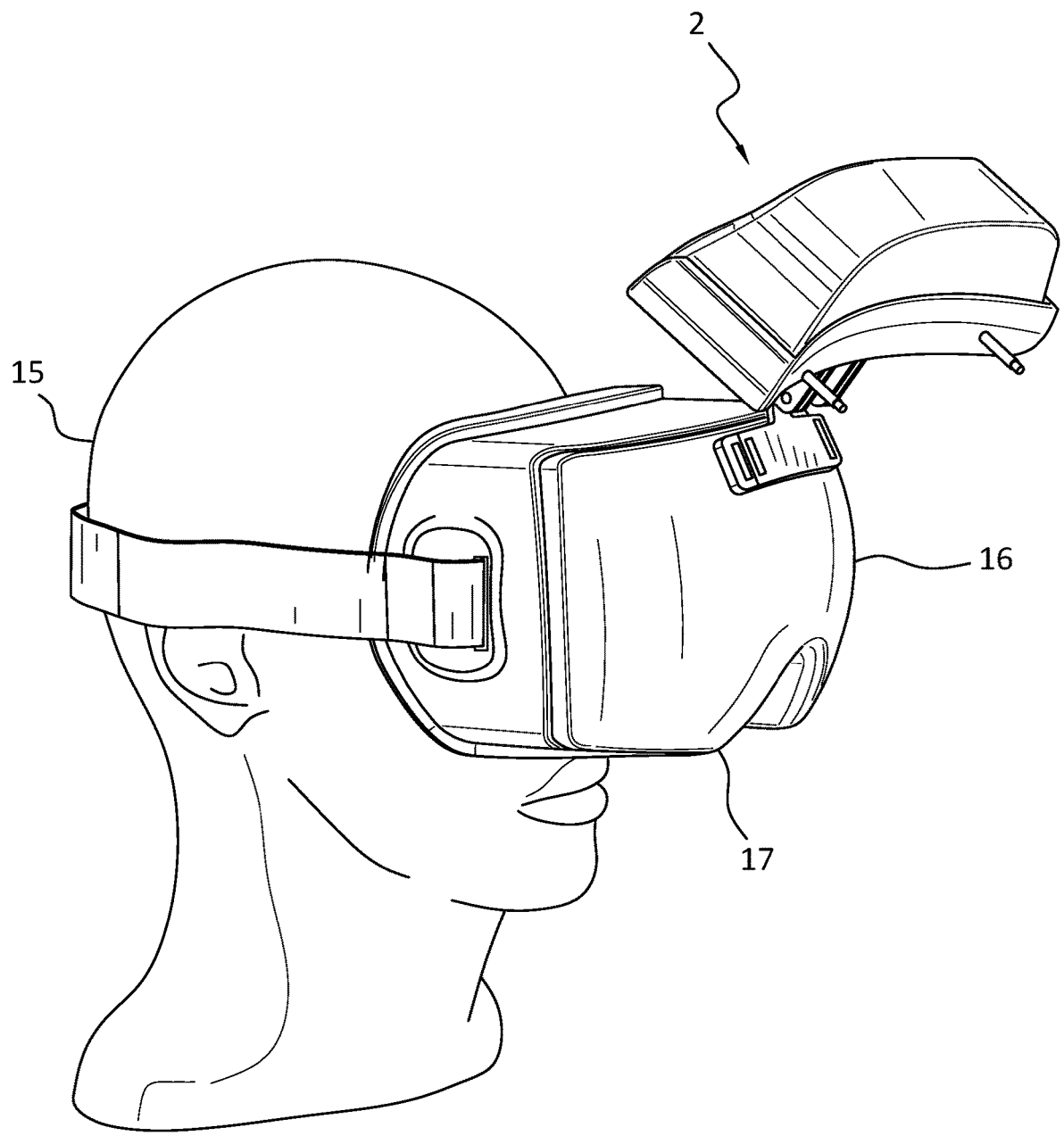
FIG. 16 a perspective view of a goggle with a heads-up display apparatus shown in a non-operative position and fixedly attached to the goggle.

Referring to FIG. 16, the housing 2 may be fixedly attached to the goggle 8 without using the strap 15. The bracket 14 may be attached to the goggle 8 by any standard means, such as with adhesives or screws. Although shown attached to the viewing window 16, it should be understood that the housing 2 may also be attached to other parts of the goggle 8 using the bracket 14 or any standard means. By attaching the housing 2 directly to the goggle 8, the user only has to put on one unit during a smoke emergency to be able to see critical information to operate the aircraft safely. The brackets 12 and 14 advantageously allows the user to pivot the housing 2 away from the goggle 8 when the smoke emergency has ceased.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. A heads-up display apparatus for attachment to a goggle, comprising:
   a) an enclosure for receiving within a first heads-up display and a second heads-up display, the enclosure having a transparent proximal wall configured to be placed outside a viewing window of the goggle and a distal wall away from the viewing window; and
   b) the proximal wall and the first heads-up display and the second heads-up display are in a line of sight of a user's first and second eyes, respectively; and
   c) the enclosure includes a strap configured to be placed around a user's head to pull the enclosure against the viewing window, the strap for removably attaching the enclosure to the goggle.

2. The heads-up display apparatus as in claim 1, wherein the proximal wall conforms to a surface of the viewing window.

3. The heads-up display apparatus as in claim 1, wherein:
   a) the enclosure includes a first bracket pivotably attached to a second bracket to hinge the enclosure horizontally; and
   b) the second bracket is for attachment to the goggle.

4. The heads-up display apparatus as in claim 1, wherein the enclosure is configured to be removably attached to the goggle.

5. The heads-up display apparatus as in in claim 1, wherein:
   a) a first bracket is attached to the enclosure, the first bracket is pivotably attached to a second bracket; and
   b) a strap operably attached to the second bracket, the strap being configured to be placed around a user's head to pull the second bracket against the goggle, the strap for removable attachment of the enclosure to the goggle.

6. The heads-up display as in claim 1, wherein the distal wall is transparent.

7. A goggle, comprising:
   a) a first enclosure including a viewing window, the first enclosure for being attached to a user's face to seal the user's eyes from smoke;

b) a second enclosure for receiving within a heads-up display, the second enclosure is operably attached to the first enclosure, the second enclosure having a transparent proximal wall adjacent to the viewing window of the first enclosure and a distal wall away from the viewing window;

c) the proximal wall, the heads-up display and the viewing window are in a line of sight of a user; and d) a first bracket attached to the second enclosure, a second bracket operably attached to the first enclosure, the first bracket is pivotably attached to the second bracket to hinge the second enclosure horizontally away from the first enclosure and the user's line of sight.

8. The goggle as in claim 7, wherein the second enclosure is detachable from the first enclosure.

9. The goggle as in claim 7, wherein the second enclosure is positionable away from and above the first enclosure out of the line of sight of the user.

10. A goggle, comprising:

a) a first enclosure including a viewing window, the first enclosure for being attached to a user's face to seal the user's eyes from smoke;

b) a second enclosure for receiving within a heads-up display, the second enclosure is operably attached to the first enclosure, the second enclosure having a transparent proximal wall adjacent to the viewing window of the first enclosure and a distal wall away from the viewing window;

c) the proximal wall, the heads-up display and the viewing window are in a line of sight of a user; and d) a strap operatively attached to the second enclosure, the strap being configured to be placed around a user's head to pull the second enclosure against the first enclosure.

\* \* \* \* \*